US012771048B2

(12) United States Patent
Yamada et al.

(10) Patent No.: US 12,771,048 B2
(45) Date of Patent: Oct. 20, 2026

(54) FEMALE TERMINAL, CONNECTOR, TERMINAL-ATTACHED ELECTRIC WIRE, CONNECTOR-ATTACHED ELECTRIC WIRE, AND WIRE HARNESS

(71) Applicants: FURUKAWA ELECTRIC CO., LTD., Tokyo (JP); FURUKAWA AUTOMOTIVE SYSTEMS INC., Inukami-gun (JP)

(72) Inventors: Takuro Yamada, Inukami-gun (JP); Takeshi Watanabe, Inukami-gun (JP); Tomoaki Tanigawa, Inukami-gun (JP); Mitsuko Adachi, Tokyo (JP); Ryosuke Nishii, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 359 days.

(21) Appl. No.: 18/632,378

(22) Filed: Apr. 11, 2024

(65) Prior Publication Data

US 2024/0258718 A1 Aug. 1, 2024

Related U.S. Application Data

(63) Continuation of application No. PCT/JP2022/037766, filed on Oct. 11, 2022.

(30) Foreign Application Priority Data

Oct. 13, 2021 (JP) ............................ JP2021-168058

(51) Int. Cl.
*H01R 4/02* (2006.01)
*H01R 13/115* (2006.01)
*H01R 13/187* (2006.01)

(52) U.S. Cl.
CPC .......... *H01R 4/023* (2013.01); *H01R 13/115* (2013.01); *H01R 13/187* (2013.01)

(58) Field of Classification Search
CPC .... H01R 13/187; H01R 13/113; H01R 13/115
(Continued)

(56) References Cited

U.S. PATENT DOCUMENTS 7,150,660 B2 12/2006 Allgood et al.
9,067,278 B2 6/2015 Mudd, II
(Continued)

FOREIGN PATENT DOCUMENTS

JP 2009-245701 A 10/2009
WO WO 2014/196446 A1 12/2014

OTHER PUBLICATIONS

Extended European Search Report issued Oct. 10, 2024, in European Patent Application No. 22880978.6, 10 pages.
(Continued)

*Primary Examiner* — Christopher M Koehler
*Assistant Examiner* — Gregory L Mangot
(74) *Attorney, Agent, or Firm* — Oblon, McClelland, Maier & Neustadt, L.L.P.

(57) ABSTRACT

A female terminal, a female connector, a terminal-attached electric wire, a connector-attached electric wire, and a wire harness can prevent a welded portion from being damaged when a conductor of an electric wire is connected by ultrasonic welding to an electric wire connection portion of a female terminal with a base portion and a spring member welded together. A female terminal includes an electric wire connection portion with a conductor of an electric wire connected by ultrasonic welding, and a terminal connection portion with a male terminal connected. The terminal connection portion includes a base portion having a pair of side walls with a connection blade of a male terminal inserted
(Continued)

therebetween, and a spring member attached to the base portion, the spring member includes a laying plate along the side walls and an arm spring, the side walls and the laying plate are welded at an endless welded portion.

17 Claims, 12 Drawing Sheets

(58) Field of Classification Search
USPC ........................................................ 439/733.1
See application file for complete search history.

(56) References Cited

U.S. PATENT DOCUMENTS

| | | | | |
|---|---|---|---|---|
| 9,985,376 | B2 * | 5/2018 | Zhang .................. | H01R 13/113 |
| 10,236,612 | B2 * | 3/2019 | Meier ................ | H01R 12/7088 |
| 2017/0062966 | A1 * | 3/2017 | Stange ................. | H01R 13/113 |
| 2020/0076105 | A1 | 3/2020 | Seipel et al. | |

OTHER PUBLICATIONS

International Search Report issued Dec. 20, 2022 in PCT/JP2022/037766 filed on Oct. 11, 2022, 2 pages.

* cited by examiner

FEMALE TERMINAL, CONNECTOR, TERMINAL-ATTACHED ELECTRIC WIRE, CONNECTOR-ATTACHED ELECTRIC WIRE, AND WIRE HARNESS

BACKGROUND OF THE INVENTION

1. Technical Field

The present disclosure relates to a female terminal, a connector, a terminal-attached electric wire, a connector-attached electric wire, and a wire harness that are used for, for example, an electric circuit through which a large current flows.

2. Description of the Related Art

An electric device conventionally constitutes an electric circuit by connecting an electric device and a power supply device with a wire harness. The wire harness and the electric device as well as the wire harness and the power supply device are connected to each other via connectors attached to the respective devices.

For example, in the connector disclosed in JP 2009-245701 A, a female terminal is housed in a connector housing. In such a female terminal, a terminal body is formed of a base portion and a spring member, and when a male terminal is inserted, an arm spring that is a part of the spring member deform to bend.

Meanwhile, since a large current flows in an electric circuit such as a drive system in an automobile, it is conceivable to weld a base portion and a spring member by laser welding or the like to ensure favorable conductivity. However, when the conductor of an electric wire is connected by ultrasonic welding to the electric wire connection portion of the female terminal to which the base portion and the spring member are welded in advance, vibration in ultrasonically welding the conductor to the electric wire connection portion acts as a load on the welded portion between the base portion and the spring member, and there is a possibility that the connection state lowers.

SUMMARY

An object of the present disclosure is to provide a female terminal, a connector, a terminal-attached electric wire, a connector-attached electric wire, and a wire harness that can prevent a welded portion from being damaged even when a conductor of an electric wire is connected by ultrasonic welding to an electric wire connection portion of a female terminal to which a spring member is welded in advance.

The present disclosure is a female terminal including an electric wire connection portion to which a conductor of an electric wire is connected by ultrasonic welding, and a terminal connection portion to which a male terminal is connected, in which the terminal connection portion includes a base portion having a pair of side walls disposed at a predetermined interval into which a male terminal is insertable, and a spring member attached to the base portion, the spring member includes a laying plate along a side surface of the side walls and an arm spring extending toward the side walls facing each other, the laying plate is disposed along an outer side surface of the side walls, the side walls and the laying plate are welded to form a welded portion, and the welded portion is an endless welded portion having an endless shape.

The present disclosure is also a connector including the female terminal and a connector housing that houses the female terminal, and further a terminal-attached electric wire including the female terminal and the electric wire connected to the base portion of the female terminal.

The present disclosure is further a connector-attached electric wire including the terminal-attached electric wire and a connector housing that houses the terminal-attached electric wire, and further a wire harness including at least either the terminal-attached electric wire or the connector-attached electric wire.

The spring member may be one spring member in which the laying plate is disposed along both outer side surfaces of the pair of side walls, another spring member in which the laying plate is disposed along both outer side surfaces of the pair of side walls, or one spring member in which the laying plate is disposed along one of the pair of side walls.

The endless shape refers to a circumferential shape in which a start point and an end point of a welded portion to be formed in a linear shape or a band shape coincide with each other, such as a circular shape, an oval shape, and a polygonal shape in which corner portions are arc-shaped, or a shape in which the start point and the end point are disposed on a middle portion so that no end portion is formed.

The present disclosure makes it possible to prevent a welded portion from being damaged even when a conductor of an electric wire is connected by ultrasonic welding to the electric wire connection portion of the female terminal to which the base portion and the spring member are welded in advance.

Specifically, the terminal connection portion of the female terminal provided with the electric wire connection portion to which the conductor of the electric wire is connected by ultrasonic welding and the terminal connection portion to which the male terminal is connected is provided with the base portion having the pair of side walls disposed at a predetermined interval into which the connection blade of the male terminal can be inserted and the spring member attached to the base portion, and the laying plate of the spring member and the side wall are welded by the endless welded portion having an endless shape.

Thus, even when the conductor of the electric wire is connected by ultrasonic welding to the electric wire connection portion of the female terminal to which the base portion and the spring member are welded in advance, and ultrasonic welding vibration acts on the welded portion, a load due to the vibration does not act locally on the welded portion, and the load can be dispersed. Thus, it is possible to prevent the welded portion from being damaged even when a conductor of an electric wire is connected by ultrasonic welding to the electric wire connection portion of the female terminal to which the base portion and the spring member are welded in advance.

As an aspect of the present disclosure, the endless welded portion may be formed in a cornerless shape having no corner portion.

The corner portion is a portion that forms a so-called edge shape in a band-shaped welded portion formed with a predetermined width by linear or wobbling, such as an intersection between end portions of linear welded portions having different orientations, an intersection between end portions of curved welded portions having different tangential directions, or an intersection between an end portion of a curved welded portion having a different tangential direction and a linear welded portion. Thus, the cornerless shape having no corner portion described above is a smooth shape having no portion forming an edge shape.

The present disclosure makes it possible to certainly prevent a welded portion from being damaged even when a conductor of an electric wire is connected by ultrasonic welding to the electric wire connection portion of the female terminal to which the base portion and the spring member are welded in advance.

Specifically, when the endless welded portion has a corner portion, a load due to vibration of ultrasonic welding for connecting the electric wire connection portion and the conductor may locally act on the corner portion. Since the endless welded portion has a cornerless shape having no a corner portion, the load due to vibration of ultrasonic welding for connecting the electric wire connection portion and the conductor is dispersed, and even when the conductor of the electric wire is connected by ultrasonic welding to the electric wire connection portion of the female terminal to which the base portion and the spring member are welded in advance, the welded portion can be reliably prevented from being damaged.

As an aspect of the present disclosure, a plurality of the endless welded portions may be formed, a plurality of the endless welded portions may be disposed in parallel in a predetermined direction at a predetermined interval, or a plurality of the endless welded portions may be continuously provided.

These disclosures make it possible to increase the welding area by the welded portion capable of preventing damage and improve the connection strength between the spring member and the base portion can even when the conductor of the electric wire is connected by ultrasonic welding to the electric wire connection portion of the female terminal to which the base portion and the spring member are welded in advance.

The endless welded portions being continuously provided described above indicates an aspect in which some of the endless welded portions intersect or coincide with each other. A plurality of endless welded portions may be continuously formed in a single stroke, or a plurality of endless welded portions may be formed so that some of the endless welded portions intersect or coincide with each other.

As an aspect of the present disclosure, a welded portion with ends having an end portion may be provided, and the endless welded portion may be disposed at the end portion of the welded portion with ends, the welded portion with ends may have a linear shape extending along a predetermined direction, and the welded portion with ends may have a wave shape or a spiral shape.

These disclosures make it possible to disperse the load due to the vibration of the ultrasonic welding for connecting the electric wire connection portion and the conductor and prevent the welded portion from being damaged even when the conductor of the electric wire is connected by the ultrasonic welding to the electric wire connection portion of the female terminal to which the base portion and the spring member are welded in advance, because, even in the welded portion with ends having an end portion where the load due to the vibration of the ultrasonic welding for connecting the electric wire connection portion and the conductor may locally act, the endless welded portion is disposed in the end portion of the welded portion with ends.

As an aspect of the present disclosure, a second welded portion may be disposed on an inner side surrounded by the endless welded portion, and the second welded portion may be a second endless welded portion having no end portion smaller than the endless welded portion.

This disclosure makes it possible to increase the welding area by the welded portion capable of preventing damage and improve the connection strength between the spring member and the base portion can even when the conductor of the electric wire is connected by ultrasonic welding to the electric wire connection portion of the female terminal to which the base portion and the spring member are welded in advance.

As an aspect of the present disclosure, the second welded portion may be a welded portion with ends having an end portion, and the end portion of the welded portion with ends may be disposed on the endless welded portion.

This disclosure makes it possible to disperse the load due to the vibration of the ultrasonic welding for connecting the electric wire connection portion and the conductor and prevent the welded portion from being damaged even when the conductor of the electric wire is connected by the ultrasonic welding to the electric wire connection portion of the female terminal to which the base portion and the spring member are welded in advance, because, even in the welded portion with ends having an end portion where the load due to the vibration of the ultrasonic welding for connecting the electric wire connection portion and the conductor may locally act, the end portion of the welded portion with ends is disposed on the endless welded portion.

As an aspect of the present disclosure, the electric wire connection portion and the terminal connection portion may be disposed in series along a longitudinal direction of the conductor connected to the electric wire connection portion.

The present disclosure makes it possible to reliably connect the conductor to the electric wire connection portion of the female terminal to which the base portion and the spring member are welded in advance and to prevent the welded portion connected in advance from being damaged.

Specifically, as compared with a case where ultrasonic vibration is performed in a direction orthogonal to the longitudinal direction of the conductor connected to the electric wire connection portion, the electric wire connection portion and the conductor can be more reliably connected by ultrasonic vibration in a direction along the longitudinal direction of the conductor.

When ultrasonic vibration is applied in a direction along the longitudinal direction of the conductor, the influence of the vibration of the ultrasonic welding easily acts on the terminal connection portion disposed in series with the electric wire connection portion along the longitudinal direction of the conductor connected to the electric wire connection portion. However, since the laying plate of the spring member and the side wall are welded by the endless welded portion having an endless shape, a load due to vibration of ultrasonic welding can be dispersed, and the welded portion can be prevented from being damaged.

DETAILED DESCRIPTION

An embodiment of the present disclosure will be described in detail below with reference to the drawings.

Figure 1A:
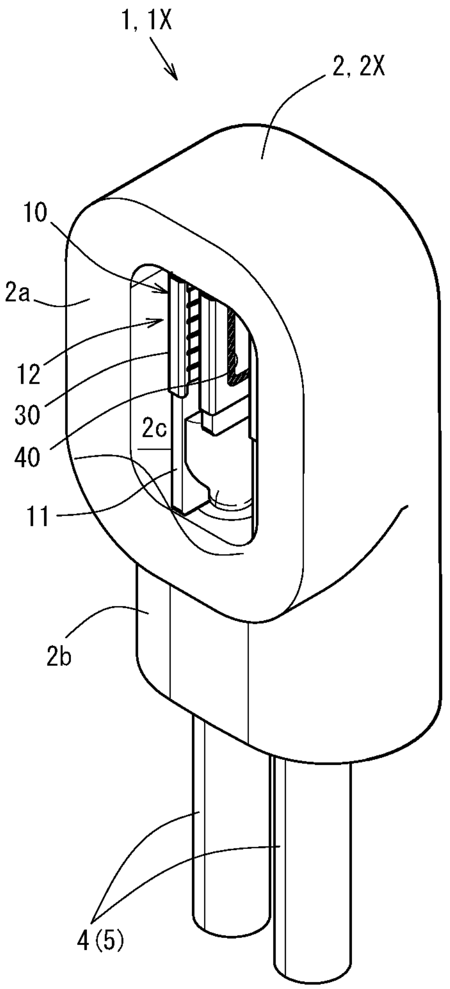
FIGS. 1A and 1B are explanatory views of a female connector.
Figure 1B:
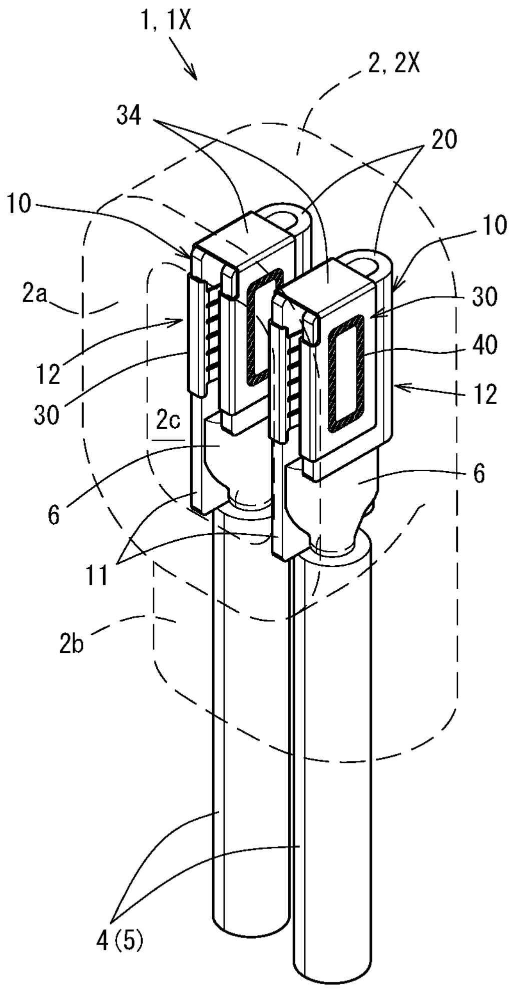
Figure 2:
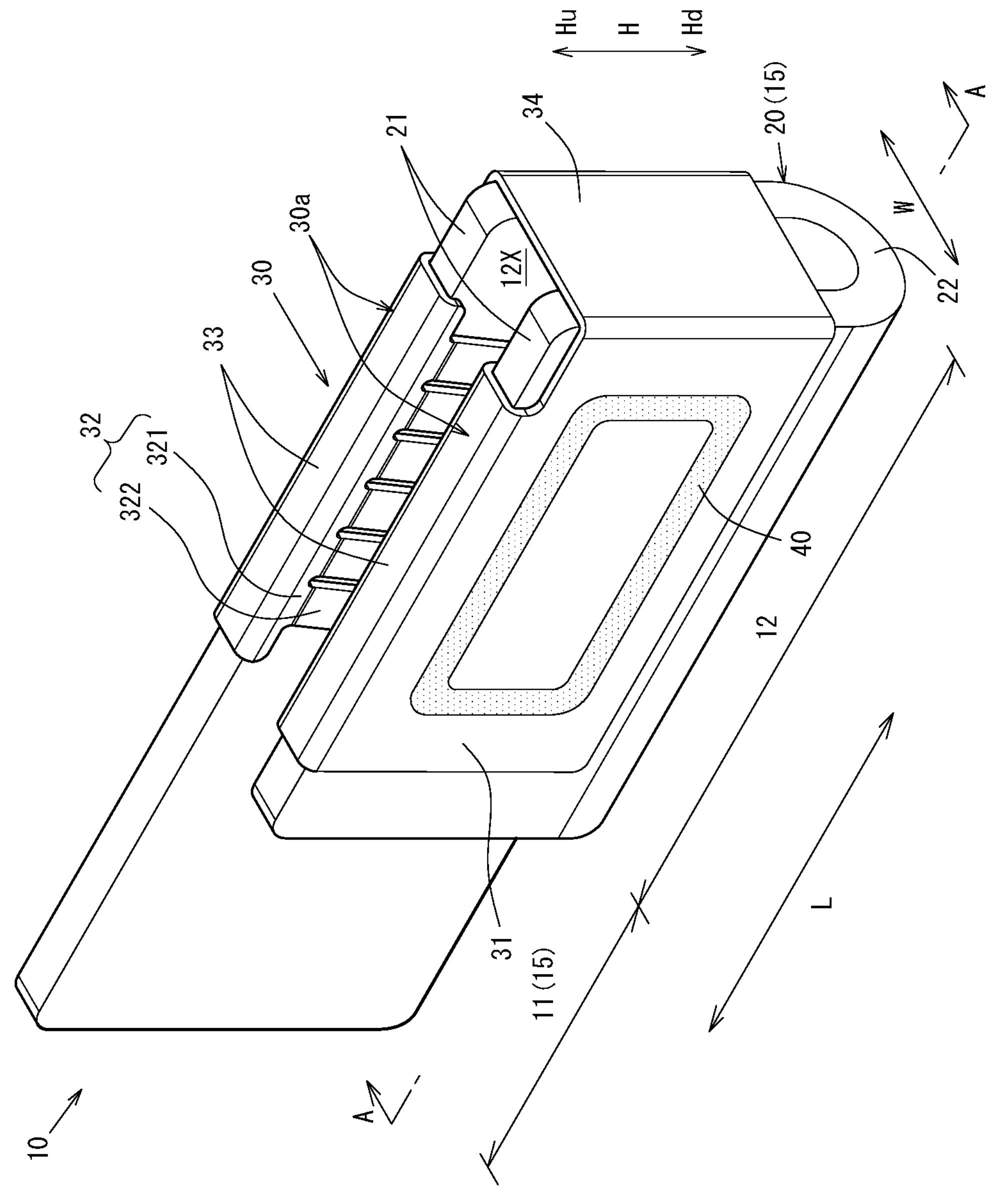
FIG. 2 is a perspective view of a female terminal.
Figures 3A, 3B:
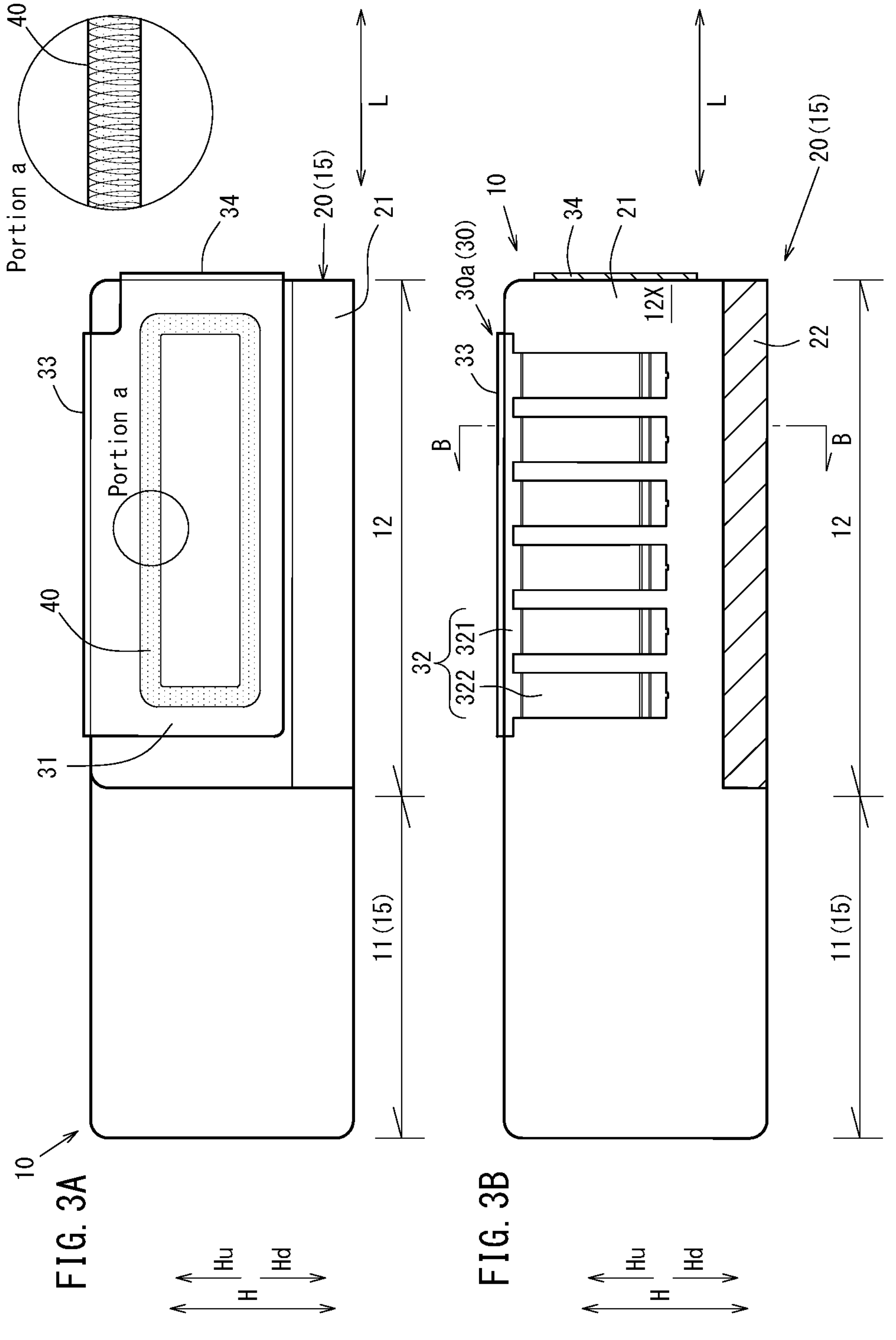
FIGS. 3A and 3B are explanatory views of the female terminal.
Figure 4B:
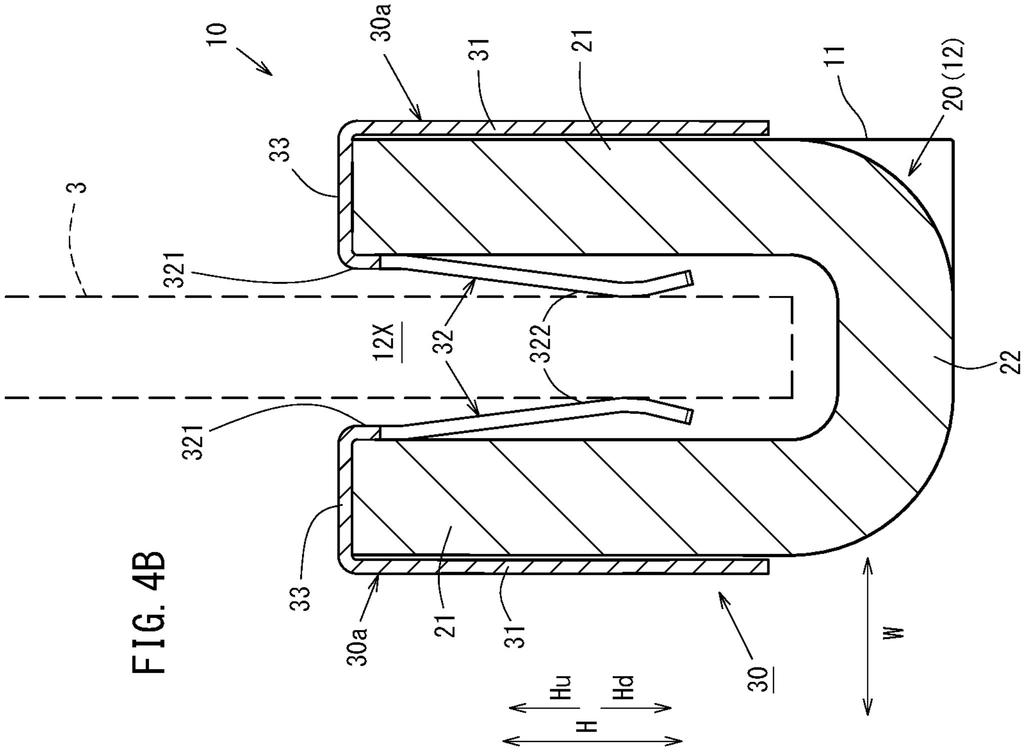
FIGS. 4A and 4B are explanatory views of the female terminal.
Figure 4A:
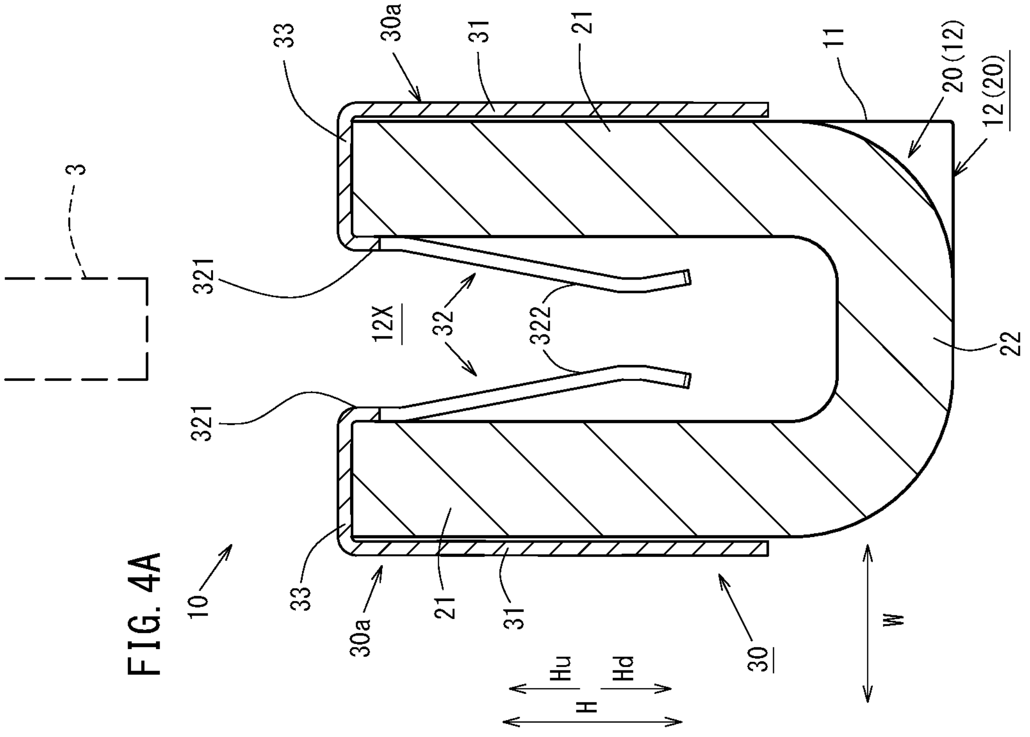
Figure 5:
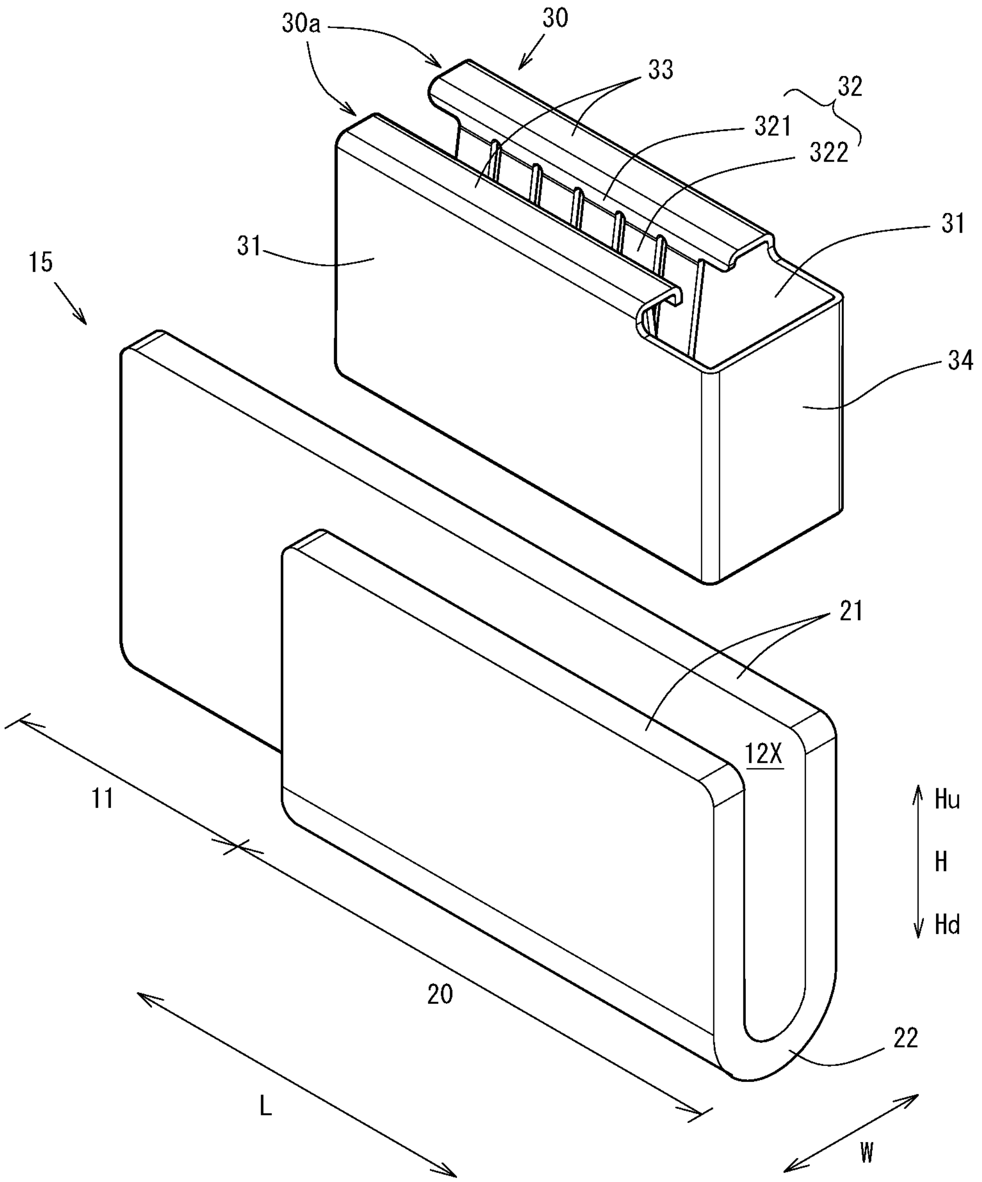
FIG. 5 is an exploded perspective view of the female terminal.

FIGS. 1A and 1B are explanatory views of a female connector-attached electric wire 1, FIG. 2 is a perspective view of a female terminal 10, FIGS. 3A, 3B, 4A, and 4B are explanatory views of the female terminal 10, and FIG. 5 is an exploded perspective view of the female terminal 10.

Figure 6A:
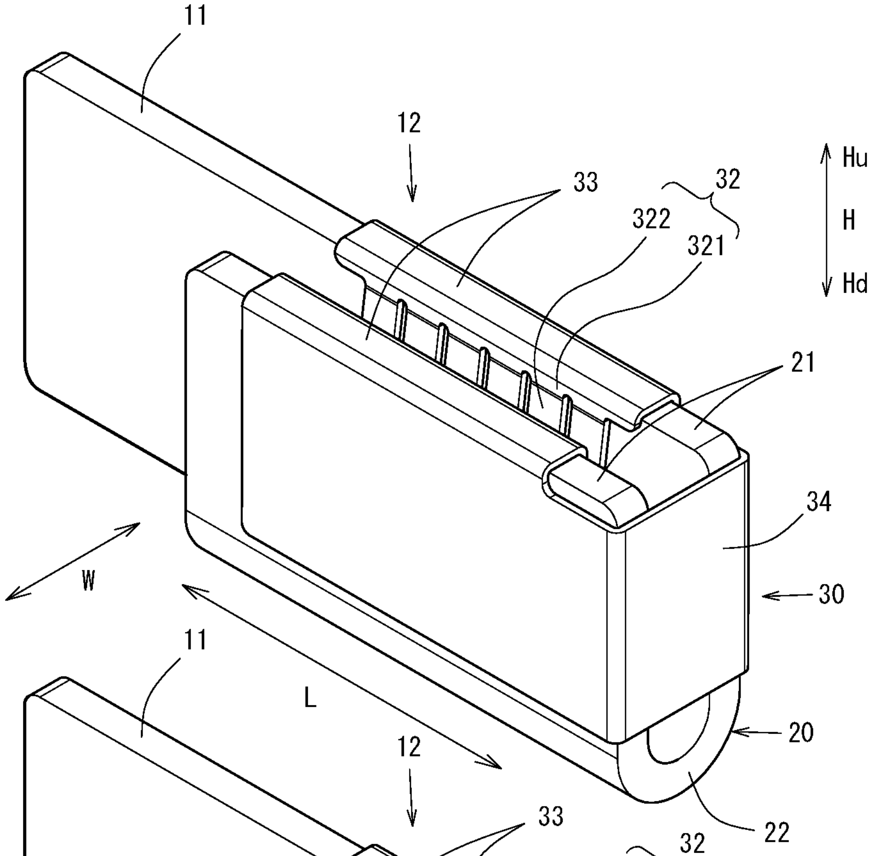
FIGS. 6A and 6B are explanatory views for describing assembly of the female terminal.
Figure 6B:
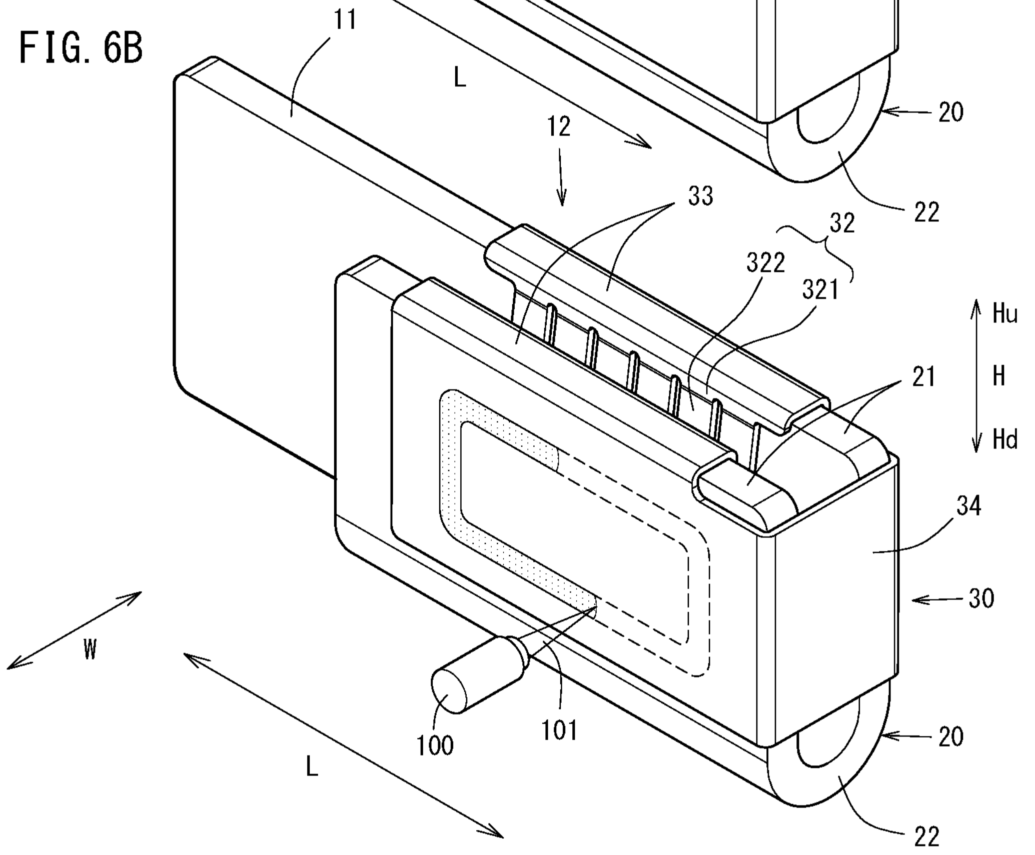
Figure 7A:
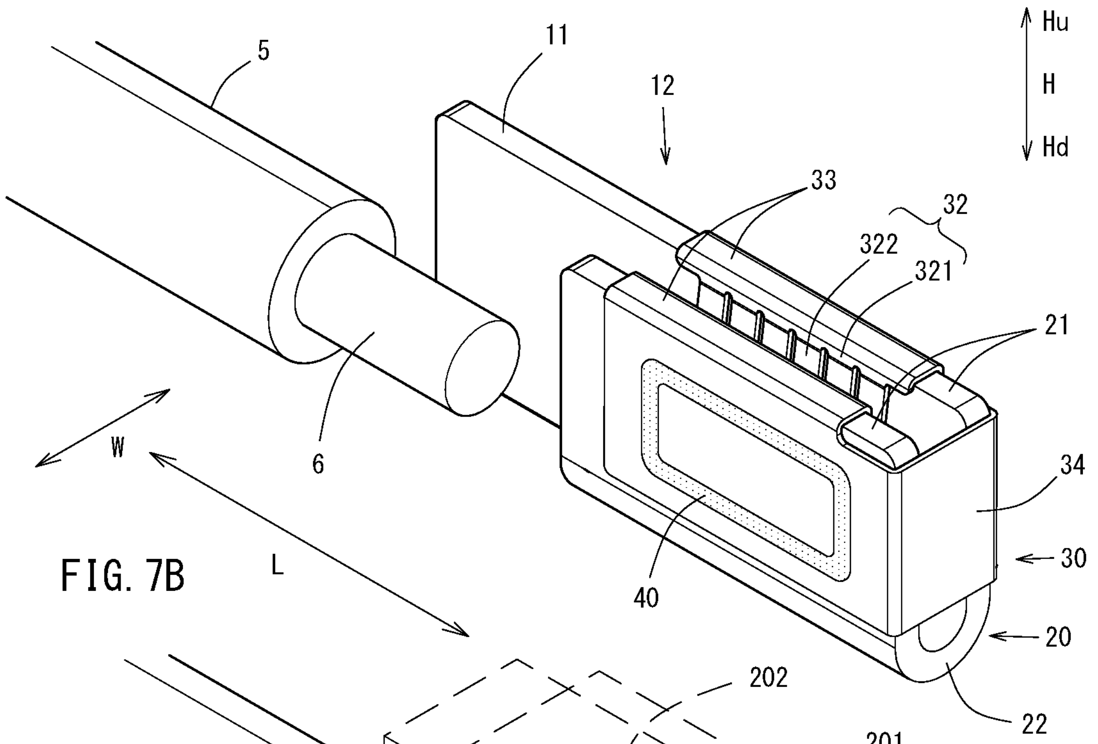
FIGS. 7A and 7B are explanatory views for describing connection of an electric wire to the female terminal.
Figure 7B:
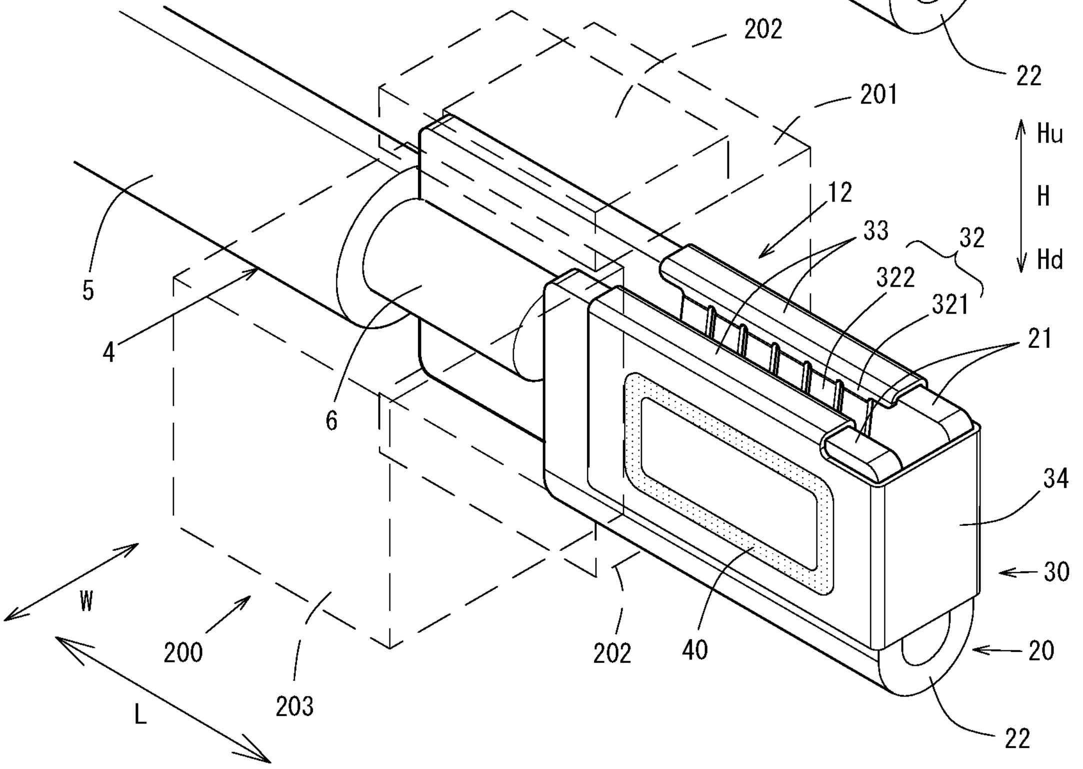
Figure 8:
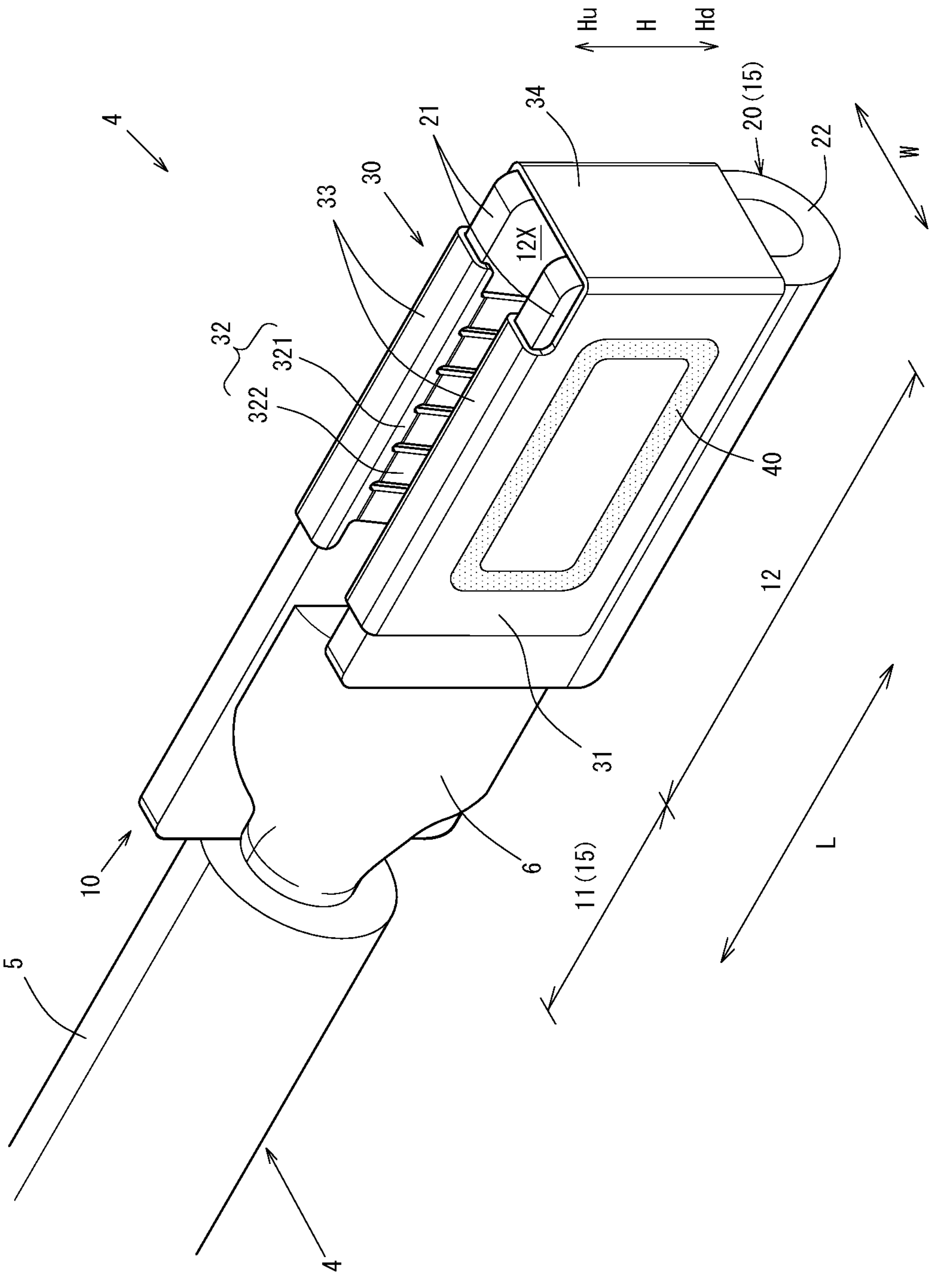
FIG. 8 is a perspective view of a female connector-attached electric wire.

FIGS. 6A and 6B are explanatory views for describing the assembly of the female terminal 10, FIGS. 7A and 7B are explanatory views for describing the connection of an electric wire 5 to the female terminal 10, and FIG. 8 is a perspective view of the female connector-attached electric wire 1.

Specifically, FIG. 1A is a perspective view of the female connector-attached electric wire 1, and FIG. 1B is a perspective view of the female connector-attached electric wire 1 in which a connector housing 2 is illustrated in a transparent state. FIG. 3A is a front view of the female terminal 10, and FIG. 3B is a sectional view taken along line the A-A in FIG. 2.

FIG. 4A is a sectional view taken along the line B-B in FIG. 3B, and FIG. 4B is a sectional view taken along the line B-B in a state of being connected to a connection blade 3 having a flat plate shape and being a part of a male terminal.

FIGS. 6A and 6B are explanatory views of the assembly of the female terminal 10, FIG. 6A is a perspective view of a state in which a base portion 20 and a spring member 30 are assembled, and FIG. 6B is a perspective view of a state in which the spring member 30 is welded to the base portion 20.

FIGS. 7A and 7B are explanatory views of the connection of the electric wire 5 to an electric wire connection portion 11 of the female terminal 10, FIG. 7A is a perspective view of a state in which a conductor 6 of the electric wire 5 is disposed in the electric wire connection portion 11, and FIG. 7B is a perspective view of a state in which the conductor 6 of the electric wire 5 is ultrasonically welded to the electric wire connection portion 11 by an ultrasonic welding machine 200.

The female terminal 10 described below includes a spring member 30 electrically connected to the flat plate-shaped connection blade 3 of the male terminal to be connected, and a terminal body 15 having the conductive base portion 20 electrically connected to the spring member 30 and the electric wire connection portion 11 connected to the electric wire 5. As illustrated in FIGS. 1A and 1B, the female terminal is disposed inside the connector housing 2 to constitute the female connector-attached electric wire 1. The connector housing 2 in which the female terminal 10 of the terminal-attached electric wire 4 is disposed is referred to as a connector 2X. The female connector-attached electric wire 1 configured as described above constitutes a part of the wire harness 1X.

The electric wire 5 is a large-current round electric wire in which the conductor 6 disposed inside is covered with an insulating covering, and an electric wire in which the female terminal 10 to be described later is connected to the conductor 6 exposed by peeling the insulating covering at a tip of the electric wire 5 is referred to as a terminal-attached electric wire 4.

The connector housing 2 includes a substantially rectangular parallelepiped first housing portion 2*a* having a disposition space 2*c* and an electric wire insertion portion 2*b* extending from the first housing portion 2*a*, and the female terminal 10 of the terminal-attached electric wire 4 inserted from the electric wire insertion portion 2*b* is disposed in the disposition space 2*c* inside the first housing portion 2*a*.

The disposition space 2*c* in which the female terminal 10 is disposed is open on the side opposite to the side where the electric wire insertion portion 2*b* is disposed in the first housing portion 2*a*, and the female terminal 10 disposed inside can be seen.

In the present embodiment, two terminal-attached electric wires 4 are attached to the female connector-attached electric wire 1, and two female terminals 10 are adjacent to each other in the disposition space 2*c*.

In the female connector-attached electric wire 1 configured as described above, a male connector (not illustrated) is connected from the opening of the first housing portion 2*a* by constituting an end portion of the wire harness 1X (not illustrated) or constituting an end portion of a branch line branched from the trunk line of the wire harness 1X, and the male terminal provided in the male connector and the female terminal 10 disposed in the disposition space 2*c* are connected, as described above.

The insulation covering is peeled off at the tip of the electric wire 5, and the female terminal 10 that is connected to the exposed conductor 6 to constitute the terminal-attached electric wire 4 is provided with the electric wire connection portion 11 and a terminal connection portion 12. The terminal connection portion 12 is assembled and includes the base portion 20 and the spring member 30 that are conductively fixed by an endless welded portion 40. The electric wire connection portion 11 and the base portion 20 constitute the terminal body 15.

In the female terminal 10, the electric wire connection portion 11 and the terminal connection portion 12 are disposed in series, and in the following description, a direction in which the electric wire connection portion 11 and the terminal connection portion 12 are disposed in series (direction connecting lower right and upper left in FIG. 2) is defined as a longitudinal direction L. A direction orthogonal to the longitudinal direction L (a direction connecting the lower left and the upper right in FIG. 2) is defined as a width direction W. Further, a direction intersecting the longitudinal direction L and the width direction W (up-down direction in FIG. 2) is defined as a height direction H, a direction in which an insertion space 12X is open (upward direction in FIG. 2) is defined as an upward direction Hu, and the opposite direction (downward direction in FIG. 2) is defined as a downward direction Hd.

The electric wire connection portion 11 is continuous in the longitudinal direction L with one side wall 21 of the base portion 20 constituting the terminal connection portion 12 to be described later, and is formed in a plate shape extending in the longitudinal direction L and the height direction H.

The terminal connection portion 12 electrically connected to the flat plate-shaped connection blade 3 (see FIG. 4B) of the male terminal includes the conductive base portion 20 including a pair of side walls 21 disposed with the insertion space 12X interposed therebetween into which the connection blade 3 can be inserted and the side wall connection portion 22 connecting the side walls 21, and the conductive spring member 30 disposed between the pair of side walls 21 in the base portion 20 and contacting the connection blade 3 inserted in the insertion space 12X such that a biasing force acts on the side wall 21 as a reaction force.

More specifically, the base portion 20 includes a side wall connection portion 22 that is disposed on one side in the longitudinal direction L with respect to the electric wire connection portion 11, is provided with two planar side walls 21 along the longitudinal direction L and the height direction H at a predetermined interval in the width direction W, and couples one end portions of the pair of side walls 21 in the height direction H to each other in the width direction W. The base portion 20 is formed in a U shape as viewed from the longitudinal direction L in which the upward direction Hu facing the side wall connection portion 22 in the height direction H is open.

As described above, one of the pair of side walls 21 is continuous with the electric wire connection portion 11 in the longitudinal direction L. In the present embodiment, the side wall 21 on the back side in the width direction W is continuous with the electric wire connection portion 11, and is formed in a U shape in which the upper side Hu in the height direction H is open.

The base portion 20 and the electric wire connection portion 11 configured as described above are formed by cutting out a terminal plate material, which is a plate material made of a conductive metal such as copper or a copper alloy, into a predetermined shape and bending the terminal plate material into the above-described shape.

The terminal body 15 constituted by the electric wire connection portion 11 and the base portion 20 is constituted by a thick plate having a predetermined thickness so as to cope with a large current, and the surface of the terminal body 15 constituted by a terminal plate material made of a metal having conductivity such as copper or a copper alloy is a non-plated member not subjected to plating treatment such as tin plating for improving conductivity. The entire surface of the terminal body 15 may be a non-plated member that is not plated, but for example, the electric wire connection portion 11 or the like may be a member that is partially plated.

The spring member 30 is mounted on the pair of side walls 21 of the base portion 20, and is configured to come into contact with the connection blade 3 (see FIG. 4B) inserted into the terminal connection portion 12 such that a biasing force toward the other side wall 21 acts with one side wall 21 as a reaction force.

Specifically, the spring member 30 is configured by connecting, at a connection portion 34 on one side in the longitudinal direction L, two inverted U-shaped spring portions 30*a* having a square inverted U-shape disposed in directions facing each other in the width direction W and having an opening in the downward direction Hd as viewed from the longitudinal direction L.

The inverted U-shaped spring portion 30*a* is formed in a rectangular inverted U-shape in which the downward direction Hd is open as viewed from the longitudinal direction L, by a laying plate 31 disposed on the outer side in the width direction W and extending in the longitudinal direction L and the height direction H, a spring plate 32 disposed at a predetermined interval on the inner side in the width direction W from the laying plate 31, and a spanning connection portion 33 connecting upper ends of the laying plate 31 and the spring plate 32 in the height direction H in the width direction W.

As illustrated in FIG. 3B, the spring plate 32 includes an arm spring that extends from a spring base portion 321 provided along the downward direction Hd from the inner side in the width direction W of the spanning connection portion 33 on the lower side Hd in the height direction H, and is inclined toward the inner side in the width direction W as it goes to the lower side Hd. The arm spring 322 has a substantially chevron shape as viewed from the longitudinal direction L.

A plurality of arm springs 322 are disposed adjacent to each other in the longitudinal direction L.

As described above, the inverted U-shaped spring portion 30*a* formed in an inverted U-shape by the laying plate 31 and the spring plate 32 is disposed in a direction facing each other in the width direction W, and the connection portion 34 connects the end portion on one side in the longitudinal direction L of the laying plate 31 in the width direction W to form the spring member 30.

The interval in the width direction W between the laying plate 31 and the spring base portion 321 of the spring plate 32 in the inverted U-shaped spring portion 30*a* is formed to be slightly wider than the thickness in the width direction W of the side wall 21, and the interval in the width direction W between the inverted U-shaped spring portions 30*a*, that is, the interval in the width direction W between the spring plates 32 connected in the width direction W by the connection portion 34 is formed to be slightly narrower than the interval between the side walls 21, in other words, the length in the width direction W of the insertion space 12X.

The spring member 30 is formed by cutting out a spring plate member having a thickness smaller than that of the terminal plate member forming the terminal body 15 and high spring property but low conductivity in a predetermined shape and bending the spring plate member.

In the spring member 30, a surface of a part of the arm spring 322 such as a surface of the arm spring 322 in contact with the connection blade 3 is plated in order to improve conductivity, for example by tin plating. Of course, the entire surface of the spring member 30 may be plated.

As illustrated in FIG. 5, the spring member 30 configured as described above is attached to the upper surfaces of the pair of side walls 21 from the upper side Hu in the height direction H, and is conductively fixed by the endless welded portion 40 to be described later to constitute the female terminal 10. In this attached state, the connection portion 34 is attached across the end side surface of the side wall 21.

Specifically, the base portion 20 and the spring member 30 are assembled in such a manner that the spring member 30 is disposed on the upper side Hu in the height direction H of the base portion 20, the spring plate 32 is disposed in the insertion space 12X, the laying plate 31 is disposed on the outer side of the side wall 21 in the width direction W, the spanning connection portion 33 is disposed at the upper end of the side wall 21, and the connection portion 34 is disposed across the end of the side wall 21 in the width direction W (see FIG. 6A). At this time, the end portion of the side wall 21 in the upward direction Hu is sandwiched from both sides in the width direction W by the base portion of the arm spring 322, that is, the spring base portion 321 and the laying plate 31.

Then, in a portion where the outer side surface of the side wall 21 in the width direction W and the laying plate 31 overlap each other in the width direction W, the fiber laser welding machine 100 is moved in a predetermined direction to form the endless welded portion 40, as illustrated in FIG. 6B, and the outer side surface of the side wall 21 and the laying plate 31 are welded and fixed. The endless welded portions 40 are formed on the laying plates 31 of the inverted U-shaped spring portions 30*a* provided on both sides in the width direction W, and are respectively welded to the paired side walls 21.

The endless welded portion 40 is a weld bead welded by the fiber laser welding machine 100, and the outer side surface of the side wall 21 and the laying plate 31 are melted and conductively connected and fixed by the endless welded portion 40.

The endless welded portion 40 is formed in a substantially rectangular shape that is longer in the longitudinal direction L than in the height direction H and has an arc corner as viewed from the outer side in the width direction W. As illustrated in an enlarged view of a portion a in FIG. 3A, the endless welded portion 40 is formed to have a predetermined width by finely moving the fiber laser welding machine 100 while drawing an oval wobbling pattern at high speed with a laser beam 101 emitted from the fiber laser welding machine 100.

Specifically, the endless welded portion 40 can be formed into an endless shape without an end portion by finely moving the fiber laser welding machine 100 along the predetermined shape from the welding start point in the predetermined shape while drawing the oval wobbling pattern at a high speed and crossing over the welded start point with the welding end point. The endless welded portion 40 is formed in a substantially rectangular shape having long arc corners, and is formed in a cornerless shape having no edge-shaped corner portion.

In this manner, the female terminal 10 configured by the terminal connection portion 12 in which the base portion 20 and the spring member 30 are assembled and conductively connected by the endless welded portion 40 and the electric wire connection portion 11 connecting the electric wire 5 can constitute the terminal-attached electric wire 4 by connecting the electric wire 5 to the electric wire connection portion 11 as described above, and can constitute the female connector-attached electric wire 1 by being attached to the connector housing 2.

Specifically, as illustrated in FIG. 7A, the conductor 6 exposed from the tip of the electric wire 5 is disposed at the electric wire connection portion 11 of the female terminal 10 to which the spring member 30 is assembled and connected by the endless welded portion 40, and is welded by the ultrasonic welding machine 200 as illustrated in FIG. 7B.

In FIGS. 7A and 7B, to facilitate understanding, the electric wire 5 is disposed on the front side (the front side in FIGS. 7A and 7B) in the width direction W with respect to the electric wire connection portion 11 and ultrasonic welding is performed in the same direction as the other drawings. However, in general, the electric wire 5 is disposed from above with respect to the electric wire connection portion 11, and the electric wire 5 is sandwiched between an anvil 201 and a crimper 203 described later in the up-down direction and ultrasonic welding is performed.

Specifically, the anvil 201 of the ultrasonic welding machine 200 is disposed on the back side of the electric wire connection portion 11 (the back side in the width direction W opposite to the side where the conductor 6 is disposed), and a regulating portion 202 is disposed on both sides of the electric wire connection portion 11 in the height direction H.

Then, the conductor 6 of the electric wire 5 and the electric wire connection portion 11 are subjected to ultrasonic welding to form the terminal-attached electric wire 4 by sandwiching the electric wire connection portion 11 in the width direction W with the crimper 203 from the front side of the electric wire connection portion 11 (the front side in the width direction W which is the side on which the conductor 6 is disposed) and applying ultrasonic vibration with the crimper 203 in the longitudinal direction L.

Then, when the male connector is connected to the female connector-attached electric wire 1, and the connection blade 3 of the male terminal attached to the male connector is inserted into the insertion space 12X from the opening side as illustrated in FIG. 4B, the connection blade 3 is interposed between the arm springs 322 of the spring plate 32, and the arm spring 322 is in close contact with the connection blade 3 in a state where the biasing force in the width direction W is applied, and can be conductively connected.

The female terminal 10 described above is provided with the electric wire connection portion 11 to which the conductor 6 of the electric wire 5 is connected by ultrasonic welding, and the terminal connection portion 12 to which the male terminal is connected. The terminal connection portion 12 is provided with the base portion 20 having a pair of side walls 21 disposed at a predetermined interval into which the connection blade 3 of the male terminal can be inserted, and the spring member 30 attached to the base portion 20. The spring member 30 includes the laying plate 31 along the side walls 21 and the arm spring 322 extending toward the side walls 21 facing each other, and the laying plate 31 is provided with respect to an outer side surface of the side walls 21. The side walls 21 and the laying plate 31 are welded by the endless welded portion 40 having an endless shape. Thus, the endless welded portion 40 can be prevented from being damaged even when the conductor 6 of the electric wire 5 is connected to the electric wire connection portion 11 of the female terminal 10 to which the base portion 20 and the spring member 30 are welded in advance by ultrasonically vibrating the crimper 203 in the longitudinal direction L.

Specifically, the terminal connection portion 12 of the female terminal 10 provided with the electric wire connection portion 11 to which the conductor 6 of the electric wire 5 is connected by ultrasonic welding and the terminal connection portion 12 to which the male terminal is connected is provided with the base portion 20 having the pair of side walls 21 disposed at a predetermined interval into which the connection blade 3 of the male terminal can be inserted and the spring member 30 attached to the base portion 20, and the laying plate 31 of the spring member 30 and the side wall 21 are welded by the endless welded portion 40 having an endless shape.

Thus, even when the conductor 6 of the electric wire 5 is connected by ultrasonic welding to the electric wire connection portion 11 of the female terminal 10 to which the base portion 20 and the spring member 30 are welded in advance, and ultrasonic welding vibration acts on the endless welded portion 40, a load due to the vibration does not act locally on the endless welded portion 40, and the load can be dispersed. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the endless welded portion 40 can be prevented from being damaged.

Since the laying plate 31 disposed along the outer side surface of the side wall 21 and the outer side surface of the side wall 21 are welded by the endless welded portions 40, the laying plate 31 along the outer side surface of the side wall 21 is not affected even when the connection blade 3 of the male terminal is inserted. Thus, it is possible to prevent an excessive load from acting on the endless welded portion 40 between the side wall 21 and the laying plate 31.

In addition, since the outer side surface of the side wall 21 and the laying plate 31 along the outer side surface are opposite to the surface of the inserted male terminal facing the side surface of the connection blade 3, the fiber laser welding machine 100 can be freely brought close to or moved in the welding step of welding the side wall 21 and the laying plate 31. Thus, the welding step can be easily performed. In addition, since the overlapping portion of the laying plate 31 with respect to the outer side surface of the side wall 21 has a shape having a wide width and a long length, any welding mode can be applied.

Since the endless welded portion 40 is formed in a cornerless shape having no edge-shaped corner portion, the welded portion can be certainly prevented from being damaged even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance.

Specifically, when the welded portion has a corner portion, a load due to vibration of the crimper 203 connecting the electric wire connection portion 11 and the conductor 6 may locally act on the corner portion. However, since the endless welded portion 40 has a cornerless shape without a corner portion, a load due to vibration of the crimper 203 connecting the electric wire connection portion 11 and the conductor 6 is dispersed. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the endless welded portion 40 can be certainly prevented from being damaged.

In addition, since the electric wire connection portion 11 and the terminal connection portion 12 are disposed in series along the longitudinal direction of the conductor 6 connected to the electric wire connection portion 11, that is, the longitudinal direction L which is the vibration direction of the crimper 203 when the conductor 6 is connected to the electric wire connection portion 11, the conductor 6 can be certainly connected to the electric wire connection portion 11 of the female terminal 10 to which the base portion 20 and the spring member 30 are welded in advance, and the welded portion connected in advance can be prevented from being damaged.

Specifically, as compared to a case where the crimper 203 is ultrasonically vibrated in the width direction W that is a direction orthogonal to the longitudinal direction of the conductor 6 connected to the electric wire connection portion 11, the connection can be more reliably made by ultrasonically vibrating the crimper 203 in the longitudinal direction L along the longitudinal direction of the conductor 6.

When the crimper 203 for ultrasonic welding is vibrated in the longitudinal direction L, which is the direction along the longitudinal direction of the conductor 6, the influence of the vibration of the ultrasonic welding easily acts on the terminal connection portion 12 disposed in series with the electric wire connection portion 11 along the longitudinal direction of the conductor 6 connected to the electric wire connection portion 11. However, since the laying plate 31 of the spring member 30 and the side wall 21 are welded by the endless welded portion 40 having an endless shape, a load due to vibration of ultrasonic welding can be dispersed, and the welded portion can be prevented from being damaged.

It is possible to achieve the effect exhibited by the female terminal 10 connecting the laying plate 31 and the side wall 21 by the endless welded portion 40 even in the connector 2X provided with the female terminal 10 and the connector housing 2 for housing the female terminal 10, the terminal-attached electric wire 4 provided with the female terminal 10 and the electric wire 5 connected to the base portion 20 of the female terminal 10, the female connector-attached electric wire 1 provided with the terminal-attached electric wire 4 and the connector housing 2 for accommodating the terminal-attached electric wire 4, and the wire harness 1X provided with at least one of the terminal-attached electric wire 4 and the female connector-attached electric wire 1.

In the female terminal 10 described above, the side wall 21 and the laying plate 31 are welded by the endless welded portion 40 formed in a substantially rectangular shape that is longer in the longitudinal direction L than in the height direction H and has arc corners. However, as described below, the endless welded portion 40 is not limited to the above-described shape.

Figures 9A, 9B:
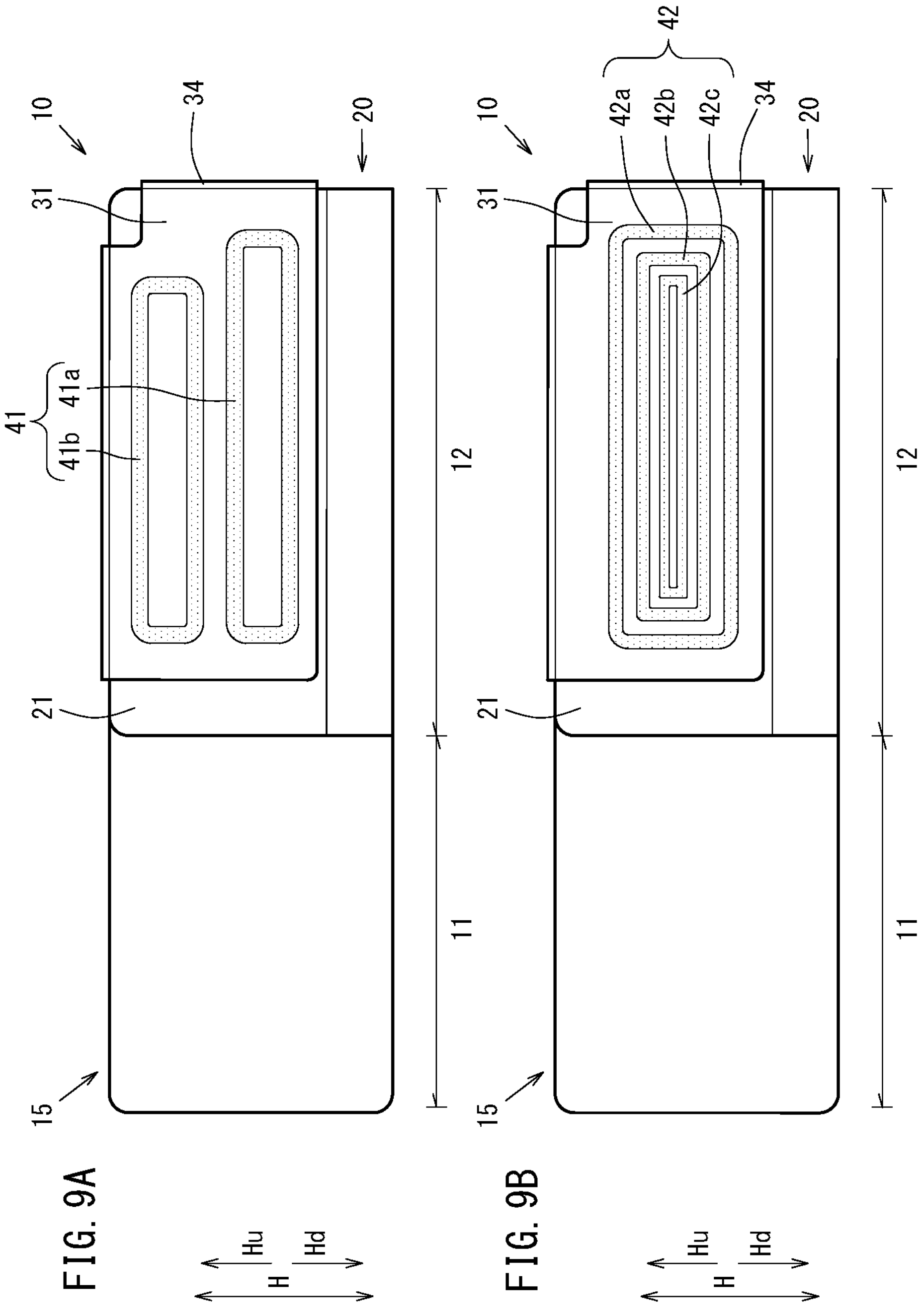
FIGS. 9A and 9B are explanatory views for describing a modification of an endless welded portion of the female terminal.

For example, as illustrated in FIG. 9A, two endless welded portions 41*a* and 41*b* may be arranged in parallel at a predetermined interval in the height direction H to form a parallel endless welded portion 41.

Specifically, the lower endless welded portion 41*a* in a downward direction Hd is formed in a substantially flat rectangular shape having a shorter length in the height direction H than the endless welded portion 40 described above.

The upper endless welded portion 41*b* disposed at a predetermined interval in the upward direction Hu with respect to the lower endless welded portion 41*a* is formed in a substantially rectangular shape having a shorter length in the longitudinal direction L than the lower endless welded portion 41*a* corresponding to the cutout portion in the upward direction Hu of the connection portion 34 in the laying plate 31.

The female terminal 10 in which the laying plate 31 and the side wall 21 are connected by the parallel endless welded portion 41 configured as described above can improve the connection strength between the spring member 30 and the base portion 20 in addition to the effect exhibited by the female terminal 10 in which the laying plate 31 and the side wall 21 are connected by the endless welded portion 40.

Specifically, since the lower endless welded portion 41*a* and the upper endless welded portion 41*b* are arranged in parallel in the height direction H at a predetermined interval to form the parallel endless welded portion 41, the connection strength between the spring member 30 and the base portion 20 can be improved because the welding area by the parallel endless welded portions 41 capable of preventing damage is increased as compared with the endless welded portions 40 even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance.

In the parallel endless welded portion 41, the lower endless welded portion 41*a* and the upper endless welded portion 41*b* are disposed at a predetermined interval in the height direction H. However, a plurality of endless welded portions may be disposed at a predetermined interval in the longitudinal direction L. In this case, the same effect as the effect of the parallel endless welded portion 41 can be obtained.

Further, as illustrated in FIG. 9B, the multiple endless welded portion 42 may be configured by disposing endless welded portions 42*b* and 42*c* at a predetermined interval on the inner side surrounded by an outermost endless welded portion 42*a* formed in an endless shape.

Specifically, the outermost endless welded portion 42*a* on the outermost side has the same shape as the above-described endless welded portion 40, and includes an intermediate endless welded portion 42*b* having a similar shape at a predetermined interval on the inner side thereof, and further includes an innermost endless welded portion 42*c* having a similar shape at a predetermined interval on the inner side thereof. Although the above-described multiple endless welded portion 42 has a triple structure, the multiple endless welded portion may have a double structure or a quadruple or more structure.

The female terminal 10 in which the laying plate 31 and the side wall 21 are connected by the multiple endless welded portion 42 configured as described above can exhibit the following effects in addition to the effects exhibited by the female terminal 10 in which the laying plate 31 and the side wall 21 are connected by the endless welded portions 40 and 41.

The endless welded portions 42*b* and 42*c* are disposed on the inner side surrounded by the outermost endless welded portion 42*a* to constitute the multiple endless welded portion 42, the intermediate endless welded portion 42*b* disposed inside the outermost endless welded portion 42*a* has a similar shape smaller than that of the outermost endless welded portion 42*a*, and the innermost endless welded portion 42*c* disposed inside the intermediate endless welded portion 42*b* has a similar shape smaller than that of the intermediate endless welded portion 42*b*. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the welding area with the multiple endless welded portion 42 capable of preventing damage is increased more than the endless welded portion 40, and the connection strength between the spring member 30 and the base portion 20 can be improved.

Figure 10A:
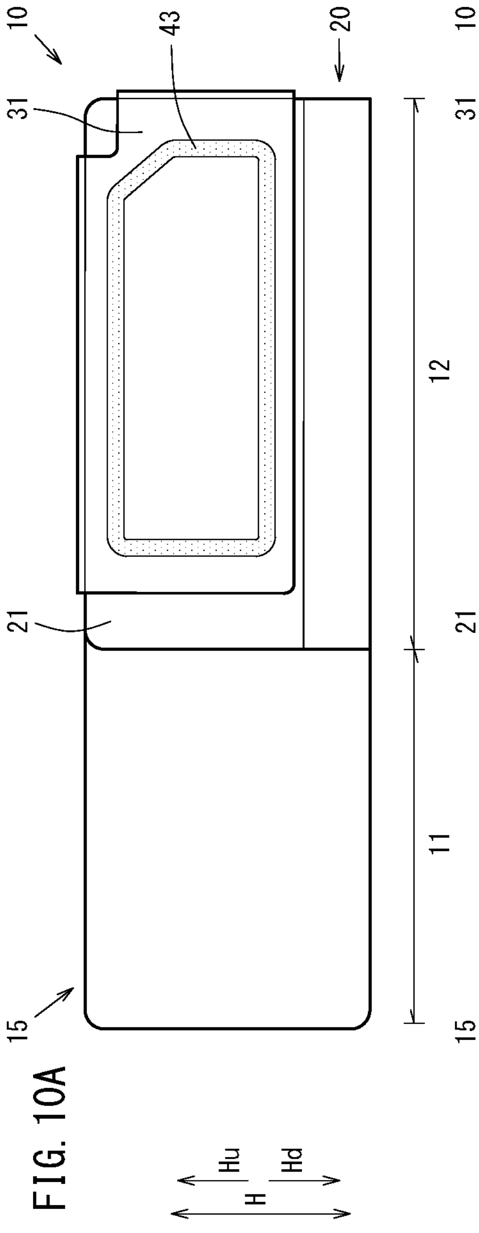
FIGS. 10A and 10B are explanatory views for describing a modification of the endless welded portion of the female terminal.

Further, as illustrated in FIG. 10A, a pentagonal endless welded portion 43 of a pentagonal shape having an oblique side corresponding to a cutout portion of the connection portion 34 in the upward direction Hu in the laying plate 31 may be used.

The pentagonal endless welded portion 43 is longer than the above-described endless welded portion 40 in the height direction H, and has a shape in which the lower endless welded portion 41*a* and the upper endless welded portion 41*b* are integrated into a pentagonal shape.

Since the welding area of the pentagonal endless welded portion 43 is larger than that of the endless welded portion 40 in the female terminal 10 in which the laying plate 31 and the side wall 21 are connected by the pentagonal endless welded portion 43 configured as described above, the effect exhibited by the female terminal 10 in which the laying plate 31 and the side wall 21 are connected by the endless welded portion 40 can be improved.

Figure 10B:
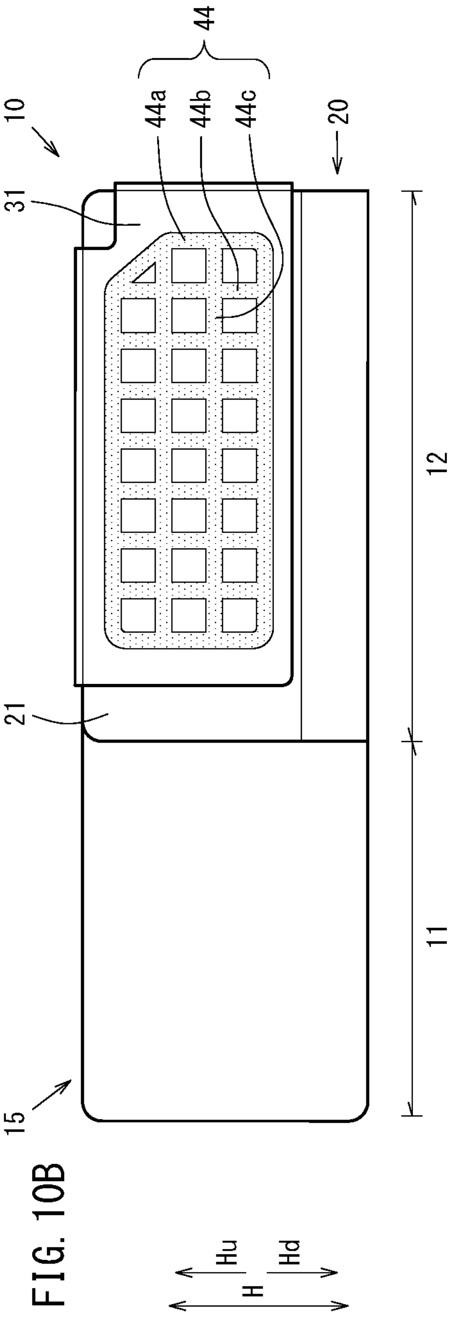

Further, as illustrated in FIG. 10B, a grid endless welded portion 44 may be configured by providing linear welded portions 44*b* and 44*c* disposed in a grid inside surrounded by the pentagonal endless welded portion 44*a* having a pentagonal shape.

Specifically, the pentagonal endless welded portion 44*a* constituting the outer shape of the grid endless welded portion 44 has the same shape as the above-described pentagonal endless welded portion 43, and the longitudinal linear welded portion 44*b* is formed along the height direction H on the inner side surrounded by the pentagonal endless welded portion 44*a*. A plurality of longitudinal linear welded portions 44*b* are provided at predetermined intervals in the longitudinal direction L.

The lateral linear welded portion 44*c* is formed along the longitudinal direction L on the inner side surrounded by the pentagonal endless welded portion 44*a*. A plurality of lateral linear welded portions 44*c* are provided at predetermined intervals in the height direction H.

The longitudinal linear welded portion 44*b* and the lateral linear welded portion 44*c* thus formed form a grid shape inside the pentagonal endless welded portion 44*a*, and both ends of each of the longitudinal linear welded portion 44*b* and the lateral linear welded portion 44*c* are disposed on the pentagonal endless welded portion 44*a*.

The female terminal 10 in which the laying plate 31 and the side wall 21 are connected by the grid endless welded portion 44 configured as described above can exhibit the following effects in addition to the effects exhibited by the female terminal 10 in which the laying plate 31 and the side wall 21 are connected by the endless welded portions 40 and 43.

In the grid endless welded portion 44, the linear welded portions 44*b* and 44*c* disposed on the inner side surrounded by the pentagonal endless welded portion 44*a* has an end portion, but the end portion of the linear welded portions 44*b* and 44*c* are disposed on the pentagonal endless welded portion 44*a*. Thus, the load due to the vibration of the crimper 203 connecting the electric wire connection portion 11 and the conductor 6 is dispersed even in the linear welded portions 44*b* and 44*c* having an end portion where the load due to the vibration of the crimper 203 connecting the electric wire connection portion 11 and the conductor 6 may act locally. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the grid endless welded portion 44 can be prevented from being damaged.

Figures 11A, 11B:
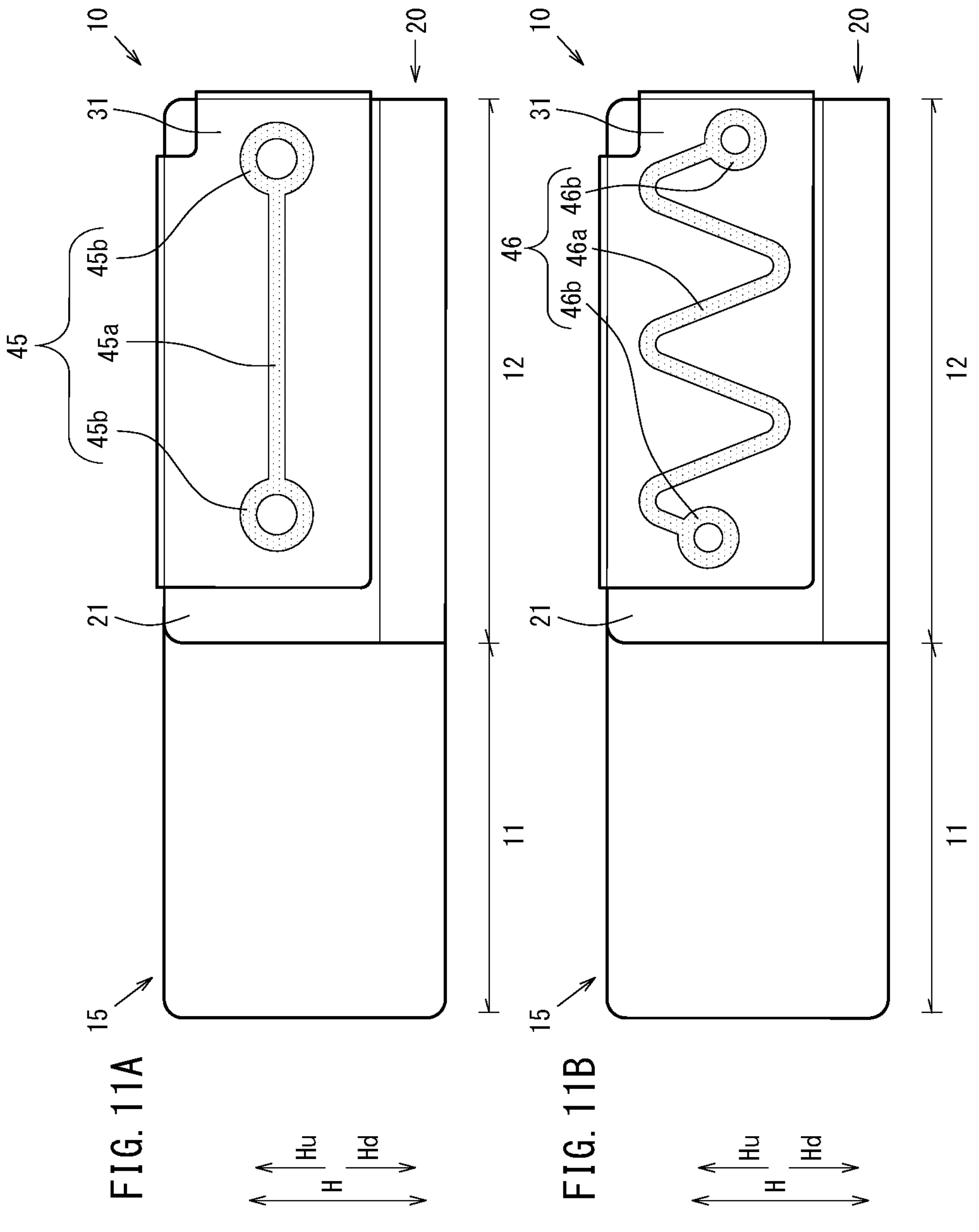
FIGS. 11A and 11B are explanatory views for describing a modification of the endless welded portion of the female terminal.

Further, as illustrated in FIG. 11A, the linear endless welded portion 45 may be configured by disposing a circular welded portion 45*b* at both end portions in the longitudinal direction L of the linear welded portion 45*a* along the longitudinal direction L. In the linear endless welded portion 45, each circular welded portion 45*b* passes through both end portions of the linear welded portion 45*a*.

The female terminal 10 in which the laying plate 31 and the side wall 21 are connected by the linear endless welded portion 45 configured as described above can exhibit the following effects in addition to the effects exhibited by the female terminal 10 in which the laying plate 31 and the side wall 21 are connected by the endless welded portion 40.

Since the endless circular welded portion 45*b* is disposed at an end portion of the linear welded portion 45*a* having an end portion, the load due to the vibration of the crimper 203 connecting the electric wire connection portion 11 and the conductor 6 is dispersed even in the linear welded portion 45*a* having an end portion where the load due to the vibration of the crimper 203 connecting the electric wire connection portion 11 and the conductor 6 may act locally. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the linear endless welded portion 45 can be prevented from being damaged. In the linear endless welded portion 45 including the linear welded portion 45*a* and the circular welded portion 45*b*, the linear welded portion 45*a* and the circular welded portion 45*b* may be continuously formed like a single stroke.

As illustrated in FIG. 11B, a wavy endless welded portion 46 may be configured by disposing a circular welded portion 46*b* at both ends in the longitudinal direction L of the wavy welded portion 46*a* extending in a zigzag manner in the height direction H and the longitudinal direction L. In the wavy endless welded portion 46, each circular welded portion 46*b* passes over both ends of the wavy welded portion 46*a*.

In the female terminal 10 in which the laying plate 31 and the side wall 21 are connected by the wavy endless welded portion 46 configured as described above, in addition to the effect exhibited by the female terminal 10 in which the laying plate 31 and the side wall 21 are connected by the endless welded portion 40, the length of the wavy welded portion 46*a* in the wavy endless welded portion 46 is longer than the length of the linear welded portion 45*a* in the linear endless welded portion 45, and the effect exhibited by the female terminal 10 in which the laying plate 31 and the side wall 21 are connected by the linear endless welded portion 45 can be improved. In the wavy endless welded portion 46 constituted by the wavy welded portion 46*a* and the circular welded portion 46*b*, the wavy welded portion 46*a* and the circular welded portion 46*b* may be continuously formed like a single stroke.

Figure 12A:
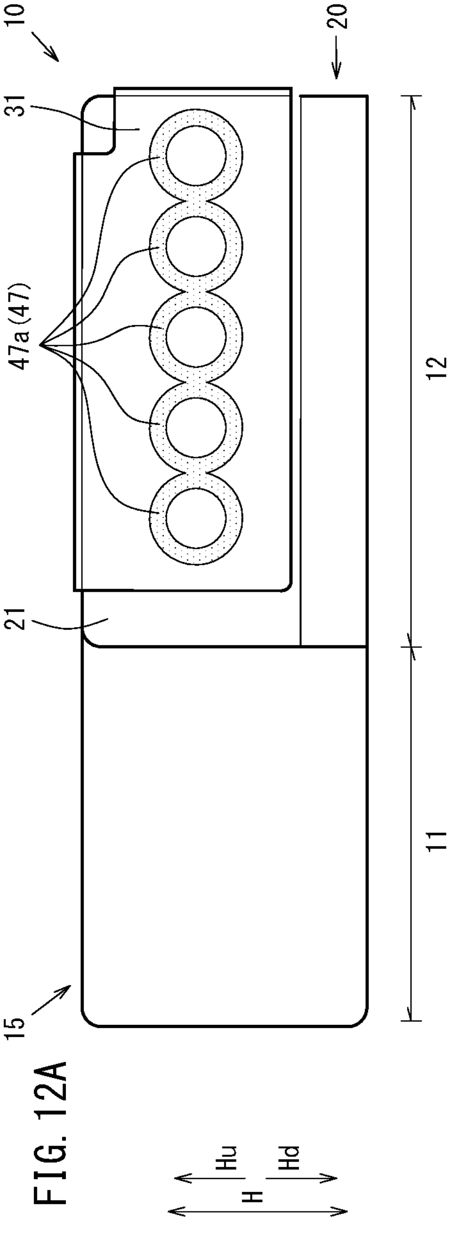
FIGS. 12A and 12B are explanatory views for describing a modification of the endless welded portion of the female terminal.

Further, as illustrated in FIG. 12A, a plurality of circular welded portions 47*a* may be continuously disposed in the longitudinal direction L while partially overlapping to form a circular endless welded portion 47. In the circular endless welded portion 47, the circular welded portions 47*a* may be separated from each other, or the circular welded portions 47*a* may be disposed in a zigzag manner.

The female terminal 10 in which the laying plate 31 and the side wall 21 are connected by the circular endless welded portion 47 configured as described above can exhibit the following effects in addition to the effects exhibited by the female terminal 10 in which the laying plate 31 and the side wall 21 are connected by the endless welded portion 40.

Since the plurality of circular welded portions 47*a* are continuously provided to constitute the circular endless welded portion 47, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the welding area by the circular endless welded portion 47 capable of preventing damage is larger than that of the endless welded portion 40, and the connection strength between the spring member 30 and the base portion 20 can be improved.

Figure 12B:
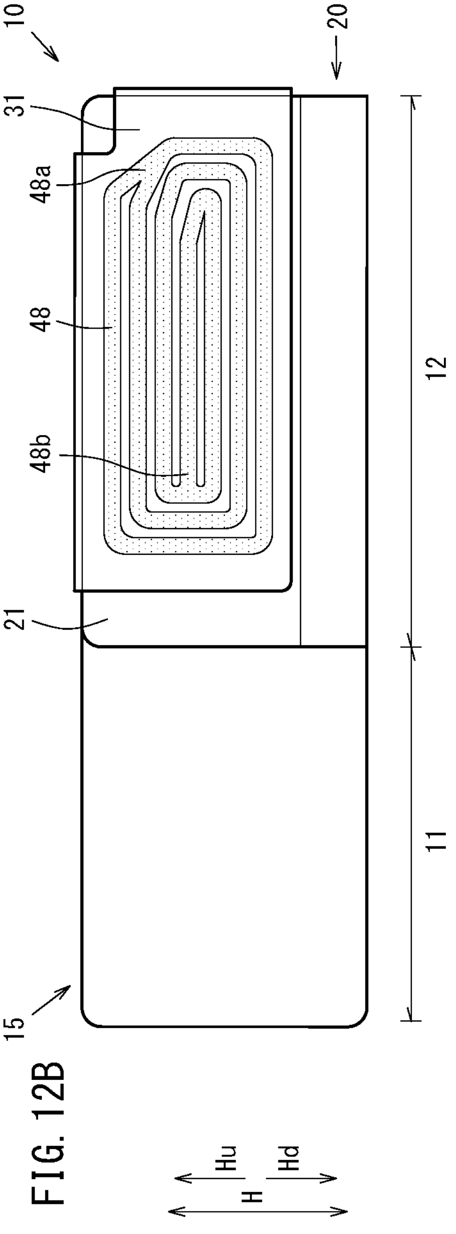

As illustrated in FIG. 12B, a spiral endless welded portion 48 formed in a spiral shape may be used. Specifically, the spiral endless welded portion 48 has an outer shape similar to that of the pentagonal endless welded portion 43, and is formed in a single stroke shape toward the radially inner side. A middle portion passes through a start point 48*a* of the spiral endless welded portion 48, and an end point 48*b* is formed on the middle portion and has an endless shape without an end portion.

The female terminal 10 in which the laying plate 31 and the side wall 21 are connected by the spiral endless welded portion 48 configured as described above can exhibit the following effects in addition to the effects exhibited by the female terminal 10 in which the laying plate 31 and the side wall 21 are connected by the endless welded portion 40.

The start point 48*a* and the end point 48*b* are disposed on the middle portion of the spiral endless welded portion 48 formed in a single stroke shape even in a spiral shape formed in a single stroke shape having an end portion on which a load due to vibration of the crimper 203 connecting the electric wire connection portion 11 and the conductor 6 may locally act. Thus, the load due to the vibration of the crimper 203 connecting the electric wire connection portion 11 and the conductor 6 is dispersed. Thus, even when the crimper 203 is ultrasonically vibrated in the longitudinal direction L to connect the conductor 6 of the electric wire 5 to the electric wire connection portion 11 of the female terminal 10 to which the base portion 20 and the spring member 30 are welded in advance, the welded portion can be prevented from being damaged. The spiral endless welded portion 48 may be formed in a spiral shape with the radially inner side as the start point 48*a* and the radially outer side as the end point 48*b*.

In the correspondence between the configuration of the present disclosure and the embodiment, the electric wire of the present disclosure corresponds to the electric wire 5, and similarly, hereinafter,

- a part of the male terminal corresponds to the connection blade 3,
- the conductor corresponds to the conductor 6,
- the electric wire connection portion corresponds to the electric wire connection portion 11,
- the terminal connection portion corresponds to the terminal connection portion 12,
- the side wall corresponds to the side wall 21,
- the base portion corresponds to the base portion 20,
- the spring member corresponds to the spring member 30,
- the laying plate corresponds to the laying plate 31,
- the arm spring corresponds to the arm spring 322,
- the endless welded portion corresponds to the endless welded portions 40, 41, 42, 43, 44, 45, 46, 47, and 48,
- the female terminal corresponds to the female terminal 10,
- the welded portion with ends corresponds to the linear welded portion 45*a* and the wavy welded portion 46*a,*
- the second welded portion corresponds to the endless welded portions 42*b* and 42*c* and the linear welded portions 44*b* and 44*c,*
- the second endless welded portion corresponds to the endless welded portions 42*b* and 42*c,*
- the connector housing corresponds to the connector housing 2,
- the terminal-attached electric wire corresponds to the terminal-attached electric wire 4, the connector-attached electric wire corresponds to the female connector-attached electric wire 1, and the wire harness corresponds to the wire harness 1X, but the present disclosure is not limited to the configuration of the above-described embodiment, and can be applied based on the technical idea shown in the claims, and many embodiments can be obtained.

For example, in the above description, the spring member 30 is configured by connecting the inverted U-shaped spring portions 30*a* provided in directions facing each other in the width direction W at the connection portion 34. However, the spring member 30 may be configured by connecting two inverted U-shaped spring portions 30*a* at a connection portion extending inside the insertion space 12X, or the spring member 30 may be configured as a separate body without connecting two inverted U-shaped spring portions 30*a*. Further, one inverted U-shaped spring portion 30*a* may constitute the spring member 30.

What is claimed is:

1. A female terminal comprising:

an electric wire connection portion to which a conductor of an electric wire is connected by ultrasonic welding; and a terminal connection portion to which a male terminal is connected, wherein the terminal connection portion includes a base portion having a pair of side walls disposed at a predetermined interval into which a male terminal is insertable, and a spring member attached to the base portion, the spring member includes a laying plate along a side surface of the side walls and an arm spring extending toward the side walls facing each other, the laying plate is disposed along an outer side surface of the side walls, the side walls and the laying plate are welded to form a welded portion, and the welded portion is an endless welded portion having an endless shape.

2. The female terminal according to claim 1, wherein the endless welded portion is formed in a cornerless shape having no corner portion.

3. The female terminal according to claim 1, wherein a plurality of the endless welded portions are formed.

4. A connector comprising:

the female terminal according to claim 1; and a connector housing that houses the female terminal.

5. The female terminal according to claim 3, wherein the plurality of endless welded portions are disposed in parallel in a predetermined direction at a predetermined interval.

6. The female terminal according to claim 3, wherein the plurality of endless welded portions are continuously provided.

7. The female terminal according to claim 3, comprising a welded portion with ends having an end portion, wherein the endless welded portion is disposed at the end portion of the welded portion with ends.

8. The female terminal according to claim 7, wherein the welded portion with ends has a linear shape extending along a predetermined direction.

9. The female terminal according to claim 8, wherein the welded portion with ends has a spiral shape.

10. The female terminal according to claim 3, wherein a second welded portion is disposed on an inner side surrounded by the endless welded portion.

11. The female terminal according to claim 10, wherein the second welded portion is a second endless welded portion having no end portion, the second endless welded portion being smaller than the endless welded portion.

12. The female terminal according to claim 10, wherein the second welded portion is a welded portion with ends having an end portion, and the end portion of the welded portion with ends is disposed on the endless welded portion.

13. A terminal-attached electric wire comprising:

the female terminal according to claim 1; and the electric wire connected to the base portion of the female terminal.

14. The terminal-attached electric wire according to claim 13, wherein the electric wire connection portion and the terminal connection portion are disposed in series along a longitudinal direction of the conductor connected to the electric wire connection portion.

15. A connector-attached electric wire comprising:

the terminal-attached electric wire according to claim 13; and a connector housing that houses the terminal-attached electric wire.

16. A wire harness comprising the terminal-attached electric wire according to claim 13.

17. A wire harness comprising the connector-attached electric wire according to claim 15.

* * * * *